United States Patent
Leng

(10) Patent No.: US 8,081,437 B2
(45) Date of Patent: Dec. 20, 2011

(54) COMPUTER WITH PROJECTING DEVICE

(75) Inventor: Yao-Shih Leng, Taipei (TW)

(73) Assignee: Micro-Star International Co., Ltd., New Taipei (TW)

( * ) Notice: Subject to any disclaimer, the term of this patent is extended or adjusted under 35 U.S.C. 154(b) by 0 days.

(21) Appl. No.: 12/203,258

(22) Filed: Sep. 3, 2008

(65) Prior Publication Data

US 2011/0164368 A1   Jul. 7, 2011

(30) Foreign Application Priority Data

Jun. 18, 2008   (TW) ................................ 97122704 A

(51) Int. Cl.
*H05K 5/00* (2006.01)
*H05K 7/00* (2006.01)

(52) U.S. Cl. ......... 361/679.23; 361/679.21; 361/679.22; 361/679.26; 361/679.55; 361/679.56

(58) Field of Classification Search ............. 361/679.21, 361/679.22, 679.23, 679.26, 679.55, 679.56
See application file for complete search history.

(56) References Cited

U.S. PATENT DOCUMENTS

| | | | | |
|---|---|---|---|---|
| 7,034,902 B2 * | 4/2006 | Tajima | ........................... | 348/836 |
| 7,046,215 B1 * | 5/2006 | Bartlett | ............................. | 345/8 |
| 7,542,270 B2 * | 6/2009 | Chen | ......................... | 361/679.25 |
| 7,885,061 B2 * | 2/2011 | Yang | ......................... | 361/679.21 |
| 2003/0165048 A1 * | 9/2003 | Bamji et al. | .................. | 361/681 |
| 2007/0138360 A1 * | 6/2007 | Martin et al. | ............ | 248/223.41 |
| 2009/0290298 A1 * | 11/2009 | Hsieh et al. | .............. | 361/679.27 |
| 2010/0039763 A1 * | 2/2010 | Hsu et al. | ................. | 361/679.26 |

FOREIGN PATENT DOCUMENTS

| | | |
|---|---|---|
| TW | M254619 | 1/2005 |
| TW | M294053 | 8/2005 |
| TW | M273911 | 7/2006 |

* cited by examiner

*Primary Examiner* — Anthony Haughton

(57) ABSTRACT

A computer with a projecting device comprises: a base shell, disposed with a top face, the top face being disposed with an opening, the opening communicating an inner part of the base shell; an expansible structure, comprising a first unit, a second unit and a third unit, in which first bottom end of the first unit is pivotally coupled to the base shell through at least one first pivot unit, a second bottom of the second unit is pivotally coupled to the first unit through at least one second pivot unit and the third unit is pivotally coupled to the second unit through a pivot structure; a first face of the third unit is coupled to a projection lens module to allow a height of the projection lens module to be changed and a projection direction thereof to be adjusted.

20 Claims, 5 Drawing Sheets

COMPUTER WITH PROJECTING DEVICE

BACKGROUND OF THE INVENTION

1. Field of the Invention

The present invention relates to a combination of a personal computer and a projecting device, and more particularly to a computer with a projecting device.

2. Description of Related Art

There are a few technologies about a computer with a projecting device disclosed by patents, for example, a portable computer with a projecting function is disclosed by Taiwan Patent application No. 200611134, in which a micro-projector is built in a mainframe, display signals of the main frame is transmitted to the micro-projector through a connection port and a projection panel is installed on the mainframe to form a portable computer allowing a projection to be used to form images. Furthermore, a portable computer having an LCD projection display system is disclosed by U.S. Pat. No. 5,510,806, in which a portable computer is disposed with a base shell, a projection screen structure and a small LCD projecting structure; the base shell is pivotally coupled to the projection screen structure; the LCD projecting structure can be lifted and closed by pivotally coupling to a groove below atop side of the base shell; images can be projected onto the projection screen while the LCD projecting structure is lifted; a rectangular base wall shields the groove while the LCD projecting structure is closed.

Each aforementioned computer coupled to a projector has a projection function, but a projection direction of each projector mentioned above cannot be changed in relation to a computer housing without except.

SUMMARY OF THE INVENTION

For further improving a conventional computer with a projecting device, the present invention is proposed.

The main object of the present invention is to provide a computer with a projecting device, allowing a height of a projection lens module of the projecting device to be changed and a projection direction thereof to be adjusted.

Another object of the present invention is to provide a computer with a projecting device, allowing a projection lens module of the projecting device to be collected in a computer housing to maintain the computer housing with a neat outlook.

Still another object of the present invention is to provide a computer with a projecting device, utilizing a height of an expansible structure with multiple collectable and foldable joints to allow a height of a projection lens module to be changed automatically.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 1:
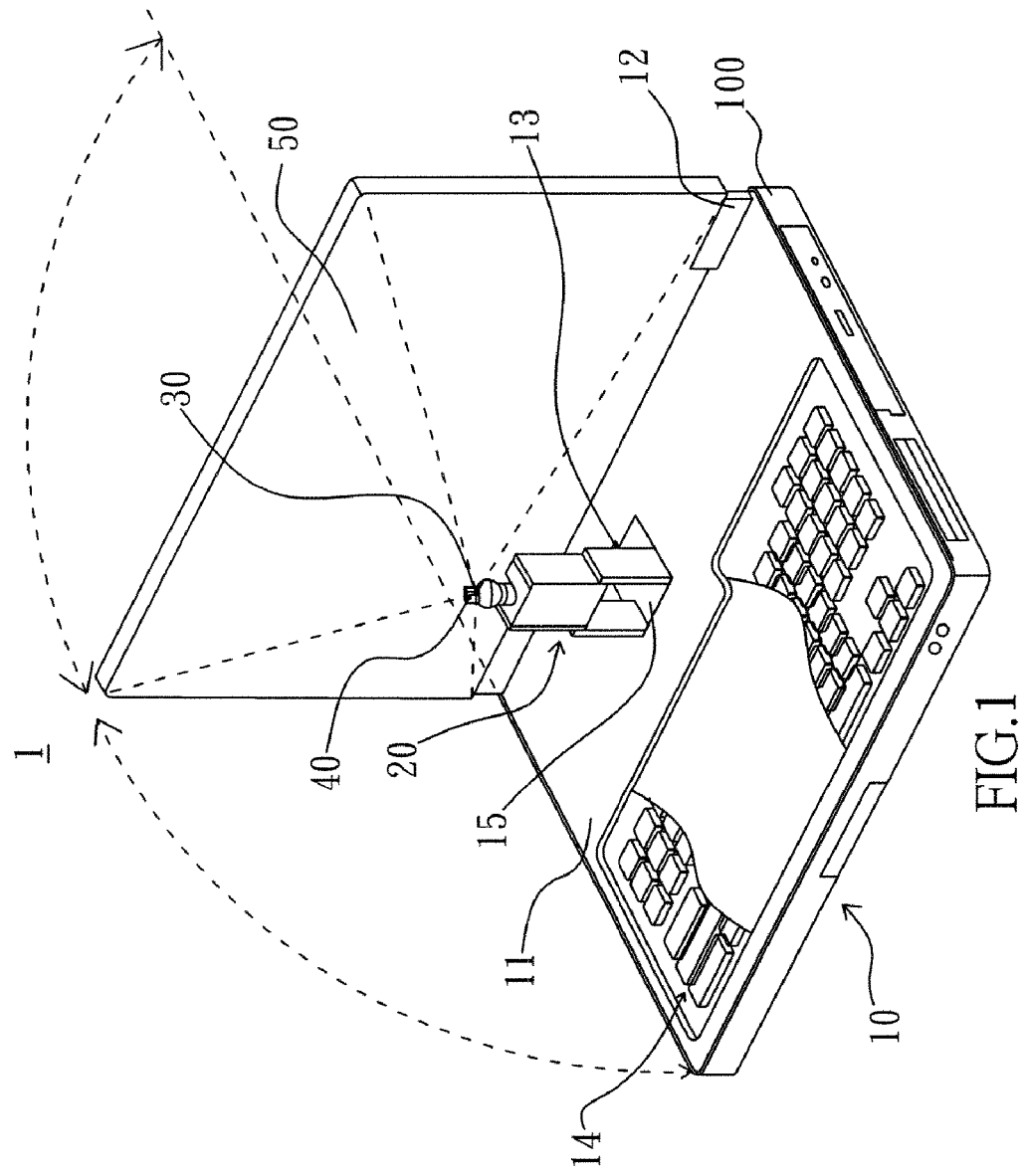
FIG. 1 is a schematically perspective view of a computer with a projecting device according to the present invention.

Please refer to FIGS. 1, 2A, 2B, 3A and 3B. The figures show a computer with a projecting device of a preferred embodiment according to the present invention. A computer 1 comprises a base shell 10, a expansible structure 20, a projection lens module 30, a video camera lens module 40 and a projection screen 50. The computer 1 may be a notebook computer or a desktop computer.

The base shell 10 is installed with circuit structures and components needed for a general computer therein, and further comprises a projector module and a video camera module, in which the projector module comprises the projection lens module 30 used for allowing the computer 1 to project out images; the video camera module comprises the video camera lens module 40 used for allowing the computer 1 to capture images.

Figure 2A:
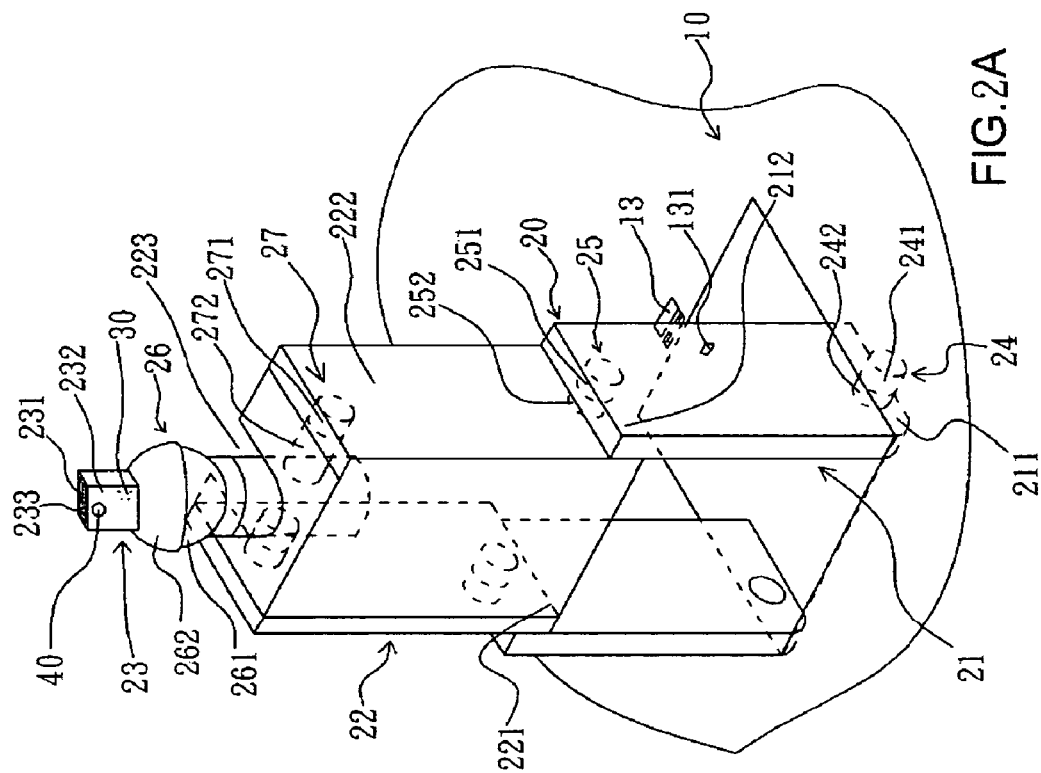
FIG. 2A is a schematically perspective view of an expansible structure according to the present invention.

The base shell 10 is disposed with a top face 11, a pivot structure 12 and a switching mechanism 13. A keyboard structure 14 needed for a general computer is installed on the top face 11 to allow a user to operate the computer 1. An opening 15 communicating an inner part of the base shell 10 is disposed on the top face 11. The pivot structure 12 is installed on a rear end 100 of the base shell 10. The pivot structure 12 is pivotally coupled to the projection screen 50 to allow the projection screen 50 to be disposed approximately perpendicular to the top face 11 to enable the projection lens module 30 to project images onto the projection screen 50, or enable the projection screen 50 to cover a upper side of the top face 11 to cause the computer 1 to be in a close state, or enable the projection screen 50 and the top face 11 to be disposed horizontally to allow the projection lens module 30 to project images onto other projection screen or a wall as FIG. 1 shows. The switching mechanism 13 is coupled to the top face 11 and adjacent to the opening 45. The switching mechanism 13 is disposed with an interference element 131 as FIG. 2A shows. The interference element 131 may be projected out toward the opening 15 to generate a mechanical interference action and in the meantime, generate an electric switching action.

Figure 2B:
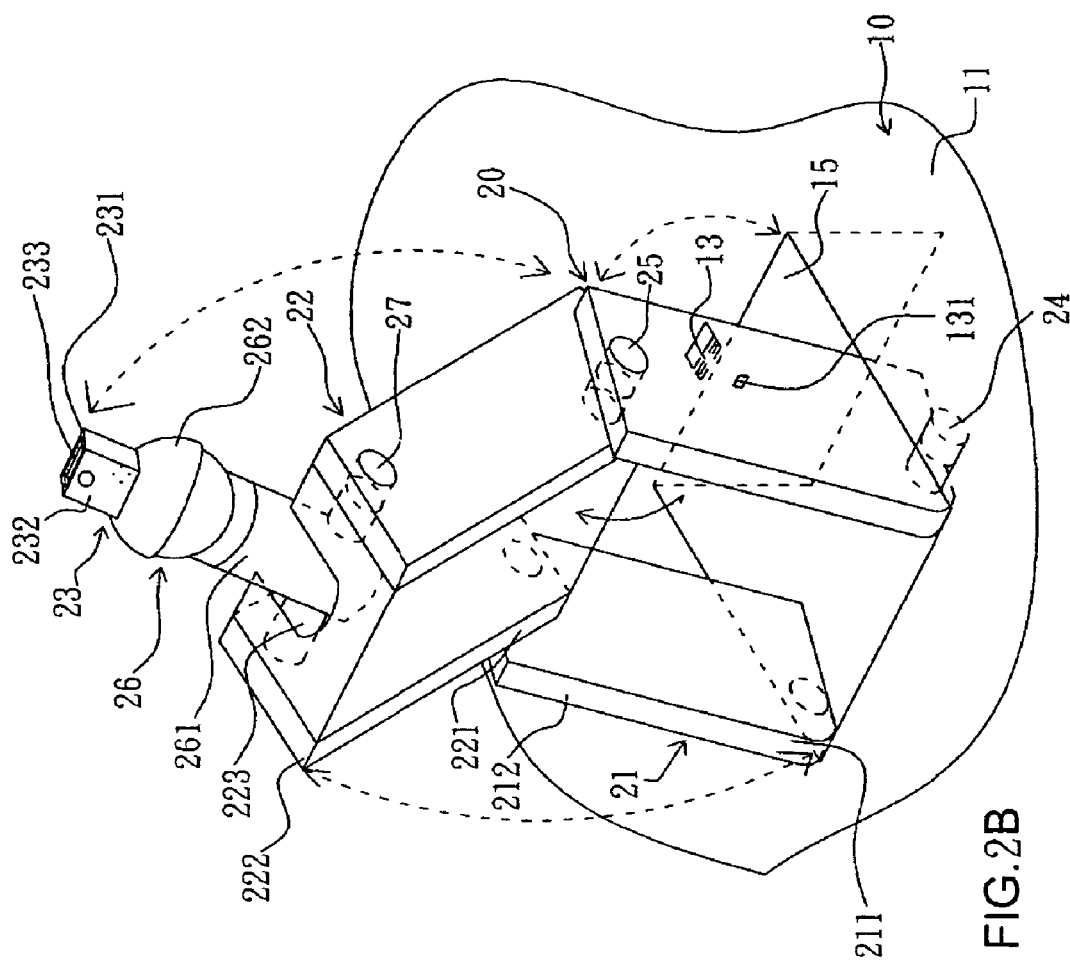
FIG. 2B is a schematically perspective view of a contracted-to-be expansible structure according to the present invention.

Please refer to FIGS. 2A and 2B. The expansible structure 20 comprises a first unit 21, a second unit 22 and a third unit 23. The first unit 21 has a first bottom end 211 and a first top end 212. The first bottom end 211 is passed through the opening 15 to place inside the base shell 10, and pivotally coupled onto the base shell 10 through at least one first pivot unit 24, in which the first pivot unit 24 is placed on an inner part of the base shell 10.

The first pivot unit 24 is disposed with a fixing element 241 and a first rotating element 242; the first fixing element 241 and the first rotating element 242 are respectively coupled to the base shell 10 and the first bottom end 211 of the first unit 21. When the first top end 212 of the first unit 21 is not limited by an external force, the first top end 212 of the first unit 21 is caused to rotate toward a position above the top face 11 through the first pivot unit 24 to allow the top end 212 to assume a state of being placed above the top face 11.

The second unit 22 has a second bottom end 221 and a second top end 222. The second bottom end 221 is pivotally coupled to the first unit 21 through at least one second pivot unit 25. The second pivot unit 25 is disposed with a second fixing element 251 and a second rotating element 252, and the second fixing element 251 and the second rotating element 252 are respectively coupled to the first unit 21 and the second unit 22. When the second top end 222 is not limited by an external force, the second top end 222 is caused to rotate toward a position above the first unit 21 through the second pivot unit 25 to allow the second top end 222 to assume a state of being placed above the first unit 21.

The third unit 23 is pivotally coupled to the second unit 22 through a pivot structure 26 and placed above the second top end 222. The pivot structure 26 may be a universal joint disposed with a fixing element 261 and a movable element 262. The fixing element 261 is placed below the movable element 262. The fixing element 231 is pivotally coupled to the second unit 22 through a third pivot unit 27. When the pivot structure 26 is not limited by an external force, the movable element 262 of the pivot structure 26 is caused to rotate toward a position above the second unit 22 through the third pivot unit 27 to allow the movable element 262 to assume a state of being placed above the second top end 222. The third pivot unit 27 is disposed with a third fixing element 271 and a third rotating element 272; the third fixing element 271 and the third rotating element 272 are respectively coupled to the second unit 22 and the fixing element 261.

The second unit 22 is further disposed with an accepting groove 223 to accept the pivot structure 26 and the third unit 23 after being closed. The third unit 23 is disposed with a first face 231, a second face 232 and a buckling unit 233; the first face 231 and the second face 232 are respectively coupled to the projection lens module 30 and the video camera lens module 40. The buckling unit 233 is corresponding to the interference element 131 and may be a slot disposed on a top end face of the third unit 23.

Figure 3A:
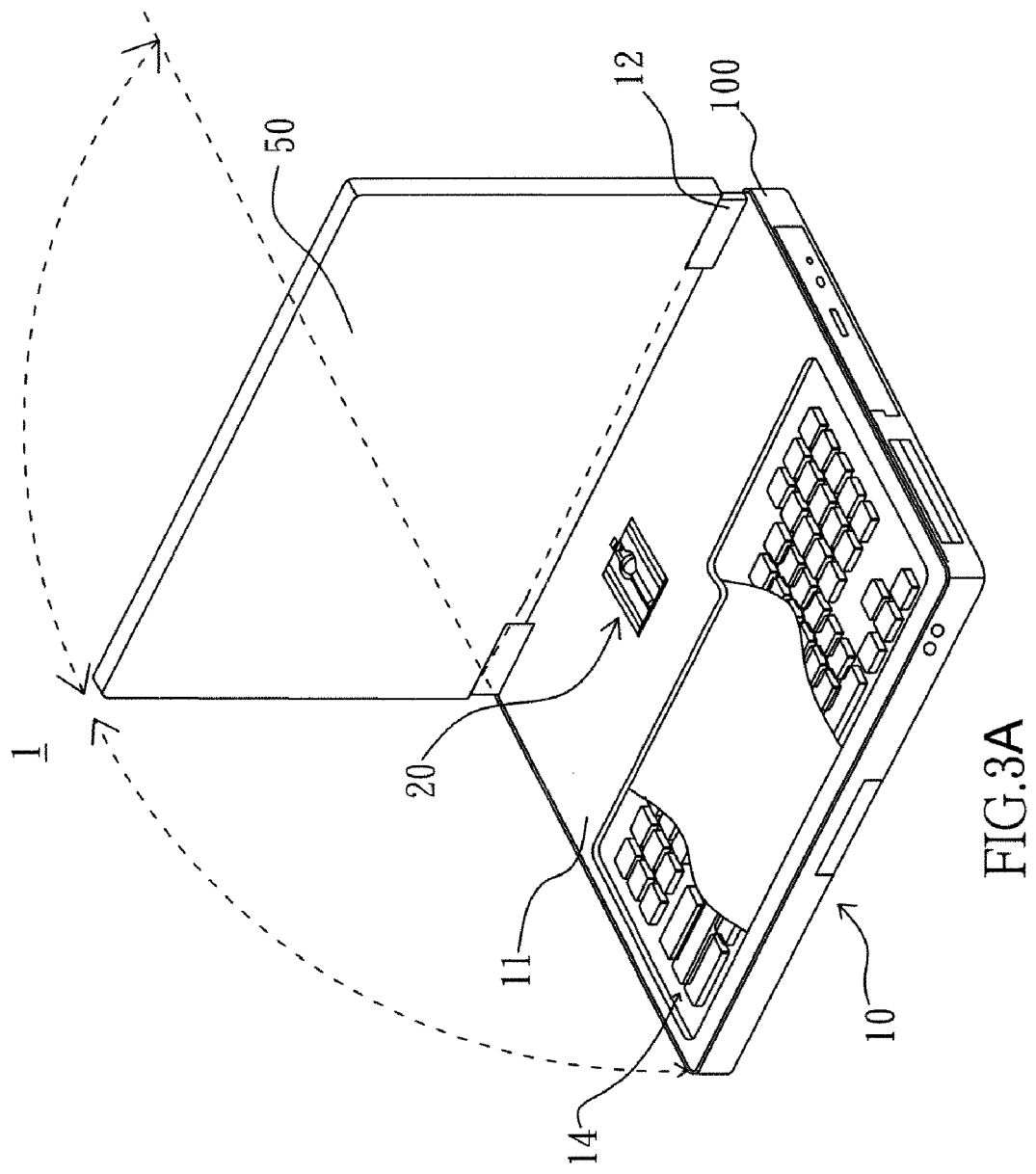
FIG. 3A is a schematically perspective view of a expansible structure in a contraction state according to the present invention.
Figure 3B:
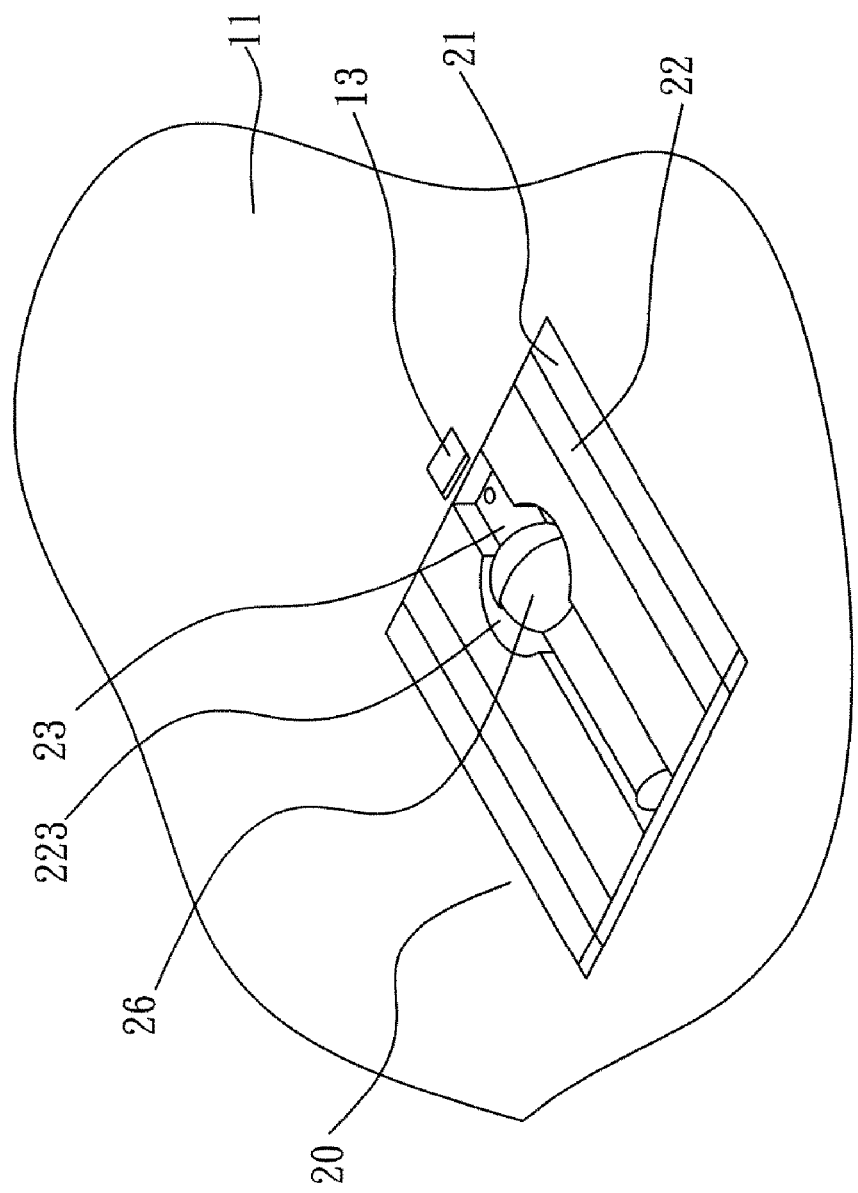
FIG. 3B is a schematically enlarged view of an expansible structure in a contraction state according to the present invention.

Heights of the contracted second unit 22 and third unit 23 respectively are smaller than a height of the first unit 21. Please refer to FIG. 2B. When a user exerts a force to cause the movable element 262 to move downward and rotate clockwise, it can drives the second top end 222 of the second unit 22 to move downward and rotate counterclockwise, and further drives the first top end 212 of the first unit 21 to move downward and rotate clockwise to allow the third unit 23 and the pivot unit 26 to be collected in the accepting groove 223 together with the second top end 222 of the second unit 22 to be leaned against the first bottom end 211 of the first unit 21, and further allows the first top end 212 of the first unit 21 to be leaned against the opening 15 to enable the first unit 21, the second unit 22 and the third unit 23 to be placed in the opening 15. Furthermore, the interference element 131 of the switching mechanism 13 is caused to have an interference action with the buckling unit 233 corresponding to the third unit 23, the expansible structure 20 can then caused to maintain a state of being placed in the opening 15 and in the meantime, the switching mechanism 13 turns off a power supply providing electricity for the projection lens module 30 and the video camera lens module 40. At this time, the expansible structure 20 and the top face 11 are approximately at the same plane such that the upper end of the base shell 10 is neat as FIGS. 3A and 3B show.

When a user operates the switching mechanism 13 to cause the interference element 13 to be released from the buckling unit 23 and in the meantime starts the power supply of the projection lens module 30 and the video camera lens module 40, the first top end 212 of the first unit 21 is caused to rise and rotate counterclockwise automatically toward a position above the top face 11 through an action of the first pivot structure 24, the second top end 222 of the second unit 22 is caused to rise and rotate clockwise automatically toward a position above the first unit 21 through an action of the second pivot unit 25, and the movable element 262 and the third unit 23 are caused to rise and rotate counterclockwise automatically toward a position above the second unit 22 through an action of the third pivot unit 27. A user may further rotate the third unit 23 to adjust an image projecting direction of the projection lens module 30 or an image capturing direction of the video camera lens module 40. A rotating rise direction of the first top end 212 is different from a rotating rise direction of the second top end 222 but the same as a rotating rise direction of the movable element 262 and the third unit 23.

The first pivot unit 24, the second pivot unit 25 and the third pivot unit 27 may respectively be a damping hinge, for example, a rotational hinge damping mechanism disclosed by U.S. Pat. No. 6,195,431 or a hinge disclosed by Taiwan Patent No. M330384. A general damping hinge is disposed with a fixing element and a rotating element; the rotating element may first be rotated to cause an elastic element to store an elastic force enabling a rotation of the rotating element. When the rotating element is not acted by a resistance, it can be rotated a proper angle relatively to the fixing element through an elastic force. However, the damping hinge allows the rotating element to rotate slowly.

The present invention may improve the deficit that a projection direction of a projector of a conventional computer with a projecting device cannot be changed in relation to a computer housing to allow a height of the projection lens module to be changed and a projection direction thereof to be adjusted, allow the projection lens module of the projecting device to be collected in the base shell of the computer to maintain a neat outlook of a surface of the base shell of the computer, and further utilize an expansible structure with multiple collectable and foldable joints to allow the projection lens module to be sprung up automatically to change the height such that the present invention has a novelty attraction.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A computer with a projecting device, comprising:
a base shell, disposed with a top face and a switching mechanism, said top face being disposed with an opening, said opening communicating an inner part of said base shell, said switching mechanism being disposed with an interference element, and said interference element being adapted to generate a mechanical interference action;
a projection lens module, used for projecting out images;
an expansible structure, comprising a first unit, a second unit and a third unit, said first unit having a first bottom end and a first top end; said first bottom end being pivotally coupled to said base shell through at least one first pivot unit, said second unit having a second bottom end and a second top end, said second bottom end being pivotally coupled to said first unit through at least one second pivot unit, said third unit being pivotally coupled to said second unit through a pivot structure, said third unit being disposed with a first face and a buckling unit and said first face being coupled to said projection lens module thereby allowing said first top end to be risen toward a position above said top face, said second unit and said third unit to be risen toward a position above said first unit and a projection direction of said projection lens module to be adjusted rotationally in relation to said second unit;

wherein, said first unit, said second unit and said third unit are accepted in said opening after being collected, and said expansible structure being further allowed to maintain in a state of being placed in said opening when said interference element and said buckling unit are interfered with each other.

2. The computer with a projecting device according to claim 1, wherein said first pivot unit is a hinge, said first top end is caused to rise automatically toward a position above said top face through said first pivot unit when said first unit is not limited by an external force.

3. The computer with a projecting device according to claim 2, wherein said second pivot unit is a hinge, said second top end is caused to rise automatically toward a position above said first top end through said second pivot unit when said second unit is not limited by an external force.

4. The computer with a projecting device according to claim 3, wherein said pivot structure is disposed with a fixing element and a movable element, said fixing element is placed under said movable element; said fixing element is pivotally coupled to said second unit through a third pivot unit; wherein said third pivot unit is a hinge, said movable element is caused to rise automatically toward a position above said second top end through said third pivot unit when said pivot structure is not limited by an external force.

5. The computer with a projecting device according to claim 4, wherein said first pivot unit, said second pivot unit and said third pivot unit respectively are a damping hinge.

6. The computer with a projecting device according to claim 5, wherein said first pivot unit is placed inside said base shell.

7. The computer with a projecting device according to claim 6, wherein said switching mechanism generates an electric switching action to turn off a power supply providing electricity for said projection lens module when said interference element is interfered with said buckling unit.

8. The computer with a projecting device according to claim 7, wherein said pivot structure is a universal joint.

9. The computer with a projecting device according to claim 8, wherein said second unit is further disposed with an accepting groove thereby accepting said pivot structure and said third unit after being collected.

10. The computer with a projecting device according to claim 9, wherein said buckling unit is a slot disposed on a top end face of said third unit.

11. The computer with a projecting device according to claim 10, wherein a rotating rise direction of said first top end is different from a rotating rise direction of said second top end but respectively is the same as rotating rise directions of said movable element and said first unit.

12. The computer with a projecting device according to claim 1, wherein a rear end of said base shell is pivotally coupled to a projection screen thereby allowing said projection lens module to project images onto said projection screen.

13. The computer with a projecting device according to claim 12, wherein said third unit is disposed with a second face, said second face is coupled to a video camera lens module, said video camera lens module is adapted to capture images.

14. The computer with a projecting device according to claim 13, wherein said switching mechanism generates an electric switching action to turn off a power supply providing electricity for said projection lens module when said interference element is interfered with said buckling unit.

15. The computer with a projecting device according to claim 5, wherein a rear end of said base shell is pivotally coupled to a projection screen thereby allowing said projection lens module to project images onto said projection screen.

16. The computer with a projecting device according to claim 15, wherein said third unit is disposed with a second face, said second face is coupled to a video camera lens module, said video camera lens module is adapted to capture images.

17. The computer with a projecting device according to claim 16, wherein said switching mechanism generates an electric switching action to turn off a power supply providing electricity for said projection lens module when said interference element is interfered with said buckling unit.

18. The computer with a projecting device according to claim 11, wherein a rear end of said base shell is pivotally coupled to a projection screen thereby allowing said projection lens module to project images onto said projection screen.

19. The computer with a projecting device according to claim 18, wherein said third unit is disposed with a second face, said second face is coupled to a video camera lens module, said video camera lens module is adapted to capture images.

20. The computer with a projecting device according to claim 19, wherein said switching mechanism generates an electric switching action to turn off a power supply providing electricity for said projection lens module when said interference element is interfered with said buckling unit.

* * * * *